United States Patent
Birsching et al.

(10) Patent No.: US 9,862,411 B2
(45) Date of Patent: Jan. 9, 2018

(54) WHEEL IMBALANCE REJECTION MODULE

(71) Applicant: Steering Solutions IP Holding Corporation, Saginaw, MI (US)

(72) Inventors: Joel E. Birsching, Vassar, MI (US); Anthony J. Champagne, Saginaw, MI (US); Michael K. Hales, Midland, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 34 days.

(21) Appl. No.: 14/812,221

(22) Filed: Jul. 29, 2015

(65) Prior Publication Data

US 2016/0031481 A1 Feb. 4, 2016

Related U.S. Application Data

(60) Provisional application No. 62/030,881, filed on Jul. 30, 2014.

(51) Int. Cl.
*B62D 5/04* (2006.01)
*B62D 7/22* (2006.01)
(Continued)

(52) U.S. Cl.
CPC ............. *B62D 7/222* (2013.01); *B62D 5/06* (2013.01); *B62D 5/0835* (2013.01); *B62D 5/0472* (2013.01)

(58) Field of Classification Search
None
See application file for complete search history.

(56) References Cited

U.S. PATENT DOCUMENTS 7,364,006 B2 * 4/2008 Birsching ............ B62D 5/0835
180/421
7,725,227 B2 * 5/2010 Pattok ..................... B62D 6/04
180/443
(Continued)

FOREIGN PATENT DOCUMENTS

CN 102066182 A 5/2011
CN 102336217 A 2/2012
(Continued)

OTHER PUBLICATIONS

German Office Action with English Translation for Application No. 102015112360.6 dated Nov. 2, 2016. (12 Pages).
(Continued)

*Primary Examiner* — Redhwan K Mawari
*Assistant Examiner* — Edward Torchinsky
(74) *Attorney, Agent, or Firm* — Cantor Colburn LLP

(57) ABSTRACT

A control system and method for a hydraulic-power steering system of a vehicle including magnetic torque overlay (MTO) is provided. The control system and method minimize undesirable vibration in a handwheel of the vehicle as a result of disturbance in its front road wheels (e.g., road-wheel imbalance). In the control system and method, a base torque command is determined or generated. At least the base torque command is passed to a disturbance-rejection module. The disturbance-rejection module modifies the base torque command to minimize the vibration.

17 Claims, 14 Drawing Sheets

(51) Int. Cl.
  *B62D 5/06* (2006.01)
  *B62D 5/083* (2006.01)

(56) References Cited

U.S. PATENT DOCUMENTS

| | | | | |
|---|---|---|---|---|
| 8,200,393 | B2* | 6/2012 | Kato | B62D 5/008 |
| | | | | 180/412 |
| 8,632,096 | B1 | 1/2014 | Quinn et al. | |
| 9,061,701 | B2* | 6/2015 | Hales | B62D 5/0472 |
| 9,079,608 | B2* | 7/2015 | Birsching | B62D 5/0835 |
| 9,120,500 | B2* | 9/2015 | Oblizajek | B62D 5/0472 |
| 9,221,491 | B2* | 12/2015 | Kodera | B62D 5/0466 |
| 9,308,934 | B2* | 4/2016 | Aoki | B62D 5/0463 |
| 9,346,489 | B2* | 5/2016 | Dutsky | B62D 5/0835 |
| 9,359,006 | B2* | 6/2016 | Kodera | B62D 5/0472 |
| 9,471,067 | B2* | 10/2016 | Birsching | G05D 16/20 |
| 2006/0052201 | A1 | 3/2006 | Augustine et al. | |
| 2007/0021889 | A1 | 1/2007 | Tsuchiya | |
| 2012/0004807 | A1 | 1/2012 | Hales et al. | |
| 2013/0158805 | A1* | 6/2013 | Champagne | B62D 5/0472 |
| | | | | 701/41 |
| 2015/0088380 | A1* | 3/2015 | Gabor | B60L 7/10 |
| | | | | 701/41 |
| 2016/0280252 | A1* | 9/2016 | Tagami | B62D 3/12 |

FOREIGN PATENT DOCUMENTS

| | | |
|---|---|---|
| CN | 102407879 A | 4/2012 |
| DE | 19616437 C1 | 8/1997 |
| DE | 102005007307 A1 | 8/2006 |
| DE | 102010025197 A1 | 12/2011 |

OTHER PUBLICATIONS

Chinese Office Action in application No. 2015010579819.2 dated Mar. 30, 2017, 14 pages.

* cited by examiner

WHEEL IMBALANCE REJECTION MODULE

CROSS-REFERENCE TO RELATED APPLICATION

This patent application claims benefit of the filing date of U.S. Provisional Patent Application 62/030,881 filed on Jul. 30, 2014 and entitled "Wheel Imbalance Rejection Module," which is incorporated herein by reference in its entirety.

FIELD OF INVENTION

The following description relates to, in general, a magnetic torque overlay (MTO) power steering system of a vehicle and, in particular, functionality of such a system for rejecting undesirable vibrations in the handwheel of the vehicle due to disturbance originating at front road wheels of the vehicle (e.g., road-wheel imbalance).

BACKGROUND

A vehicle is subject to some degree of disturbance in its front road wheels (e.g., road-wheel imbalance). This disturbance can cause undesirable vibrations in the steering wheel or handwheel detectable by a driver. These vibrations are directly related to the rotational mean velocity of the road wheels. The severity of the vibrations at the handwheel depends upon both the magnitude of the disturbance and the chassis and steering design.

Methods have been employed to reduce handwheel vibrations due to road-wheel disturbance. One method is to reduce the source of the disturbance. However, this approach has practical limitations. For example, in the case of road-wheel imbalance, there are changes in the imbalance over tire and wheel wear.

Another method is to minimize transmissibility of the disturbance to the driver. The transmissibility is affected by physical design of the chassis and steering system and tuning of the steering system. However, there are limitations to such minimization because of trade-offs with other design considerations.

In vehicles equipped with electric-power steering (EPS), another method is to minimize transmissibility of road-wheel imbalance—namely, targeted algorithms are specifically aimed at rejecting disturbance due to road-wheel imbalance. With such an approach, it is possible to reject the disturbance with minimal impact on other performance aspects of the system. In vehicles equipped with hydraulic-power steering (HPS), the transmissibility may be minimized through mechanical methods, such as selection of torsional stiffness of T-bars, increased friction, and mounting stiffness.

SUMMARY OF INVENTION

A system and method to minimize or eliminate undesirable vibration in a handwheel of a vehicle as a result of disturbance originating from front road wheels (e.g., road-wheel imbalance) of the vehicle in a hydraulic-power steering system (HPS system) including magnetic torque overlay (MTO) is provided.

In one non-limiting exemplary embodiment of the invention, a control system and method for the MTO steering system is provided. In the system and method, a base torque command is determined or generated. At least the base torque command is passed to a disturbance-rejection module. The disturbance-rejection module modifies the base torque command to minimize vibration at the handwheel. A resulting final torque command is provided to a current-command module that converts the base torque command into a required current command. The required current command is applied to a coil of a magnetic actuator in a steering gear of the MTO steering system. At least the required current command is used to generate an estimation of torque by a driver of the vehicle.

In an aspect of this embodiment, a measurement of differential pressure across a piston in the MTO steering system and various signals of the vehicle and an estimation of torque signals of the driver are used to generate the base torque command. In a version of this aspect, the vehicle signals include speed of the vehicle (i.e., front wheels) and angle of the handwheel. In another aspect, the driver-torque-signal estimation, hand-wheel angle, and vehicle speed are passed also to the disturbance-rejection module. In still another aspect, the measured differential pressure is used also to generate the driver-torque estimation.

BRIEF DESCRIPTION OF THE DRAWINGS

The subject matter that is regarded as the invention is particularly pointed out and distinctly claimed in the claims at the conclusion of the specification. The foregoing and other features and advantages of the invention are apparent from the following detailed description taken in conjunction with the accompanying drawing in which:

DETAILED DESCRIPTION

Figure 1:
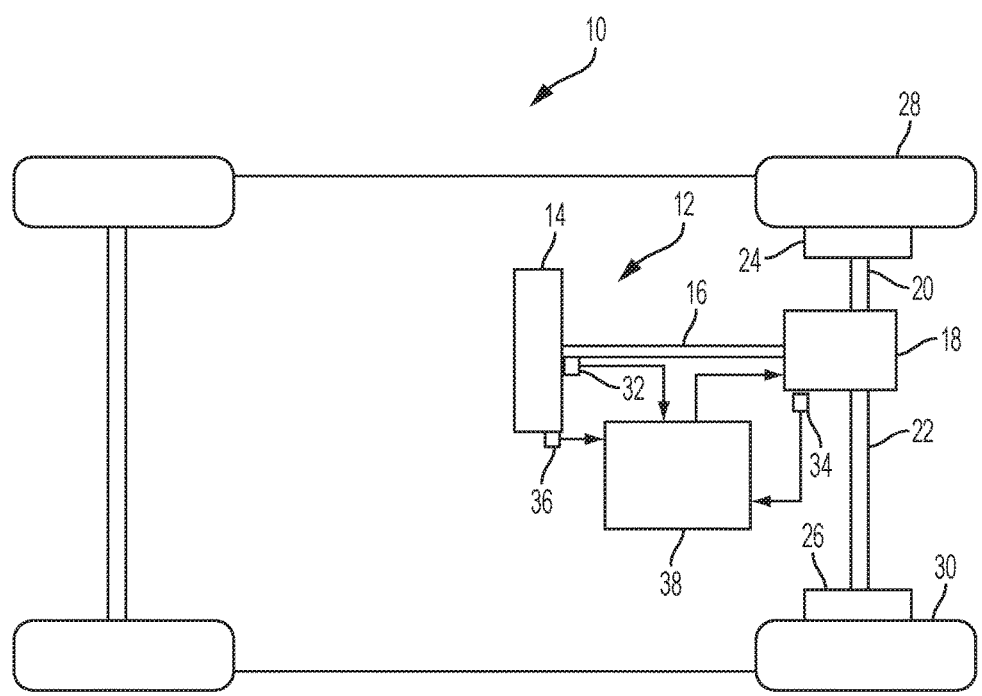
FIG. 1 is a schematic diagram illustrating a non-limiting exemplary embodiment of a vehicle including a hydraulic-power steering system (HPS system)

Throughout the drawings, corresponding reference numerals indicate like or corresponding parts and features. Referring now to the Figures, the invention will be described with reference to specific exemplary embodiments thereof without limiting same. FIG. 1 is a schematic diagram illustrating a non-limiting, exemplary, embodiment of a vehicle 10 including a steering system 12 that may be a hydraulic-power steering (HPS) system.

As shown in the FIG. 1, the steering system 12 includes a steering wheel or handwheel 14, a steering shaft 16, a steering assist unit 18, tie rods 20, 22, and steering knuckles 24, 26. The steering shaft 16 extends between, and is coupled to, the handwheel 14, and the steering assist unit 18. Each tie rod 20, 22 is coupled to, and projects outward from, the steering assist unit 18. During operation, as the handwheel 14 is turned by a driver of the vehicle 10, the steering assist unit 18 provides additional torque assistance (i.e., a desired assist torque) to move the tie rods 20, 22, which, in turn, move corresponding steering knuckles 24, 26 coupled to front road wheels 28, 30 of the vehicle 10.

The vehicle 10, or the steering system 12, includes various sensors 32, 34, 36 that detect and measure observable conditions of steering parameters relative to the steering system 12 and/or other conditions relative to the vehicle 10. The sensors 32, 34, 36 generate sensor signals based upon the observable conditions. The sensors 32, 34, 36 can include, for example, a load sensor, a driver-torque sensor, and/or a position sensor. A control center 38 controls operation of the steering system 12 and/or vehicle 10 based upon one or more of the sensor signals and control system and method of the present disclosure. Generally speaking, dynamic response of the steering system 12 is measured or calculated, and command signals to the steering system 12 are modified such that desired results are achieved. A disturbance-cancel command is modified in such a way that, when applied to a torque signal, the vehicle 10 is controlled in a desired manner to counteract a disturbance introduced into the steering system 12 (in particular, the road wheels 28, 30). One example of a disturbance may be attributable to road-wheel imbalance.

It is desired to achieve a result with regard to the steering assist unit 18—for example, by rejecting the disturbance. It should be readily appreciated that, while not shown here, the system and method can also be made variable based upon other features and/or variables of the steering system 12. Some examples include torque of the handwheel 14 and speed of the vehicle 10.

Figure 2:
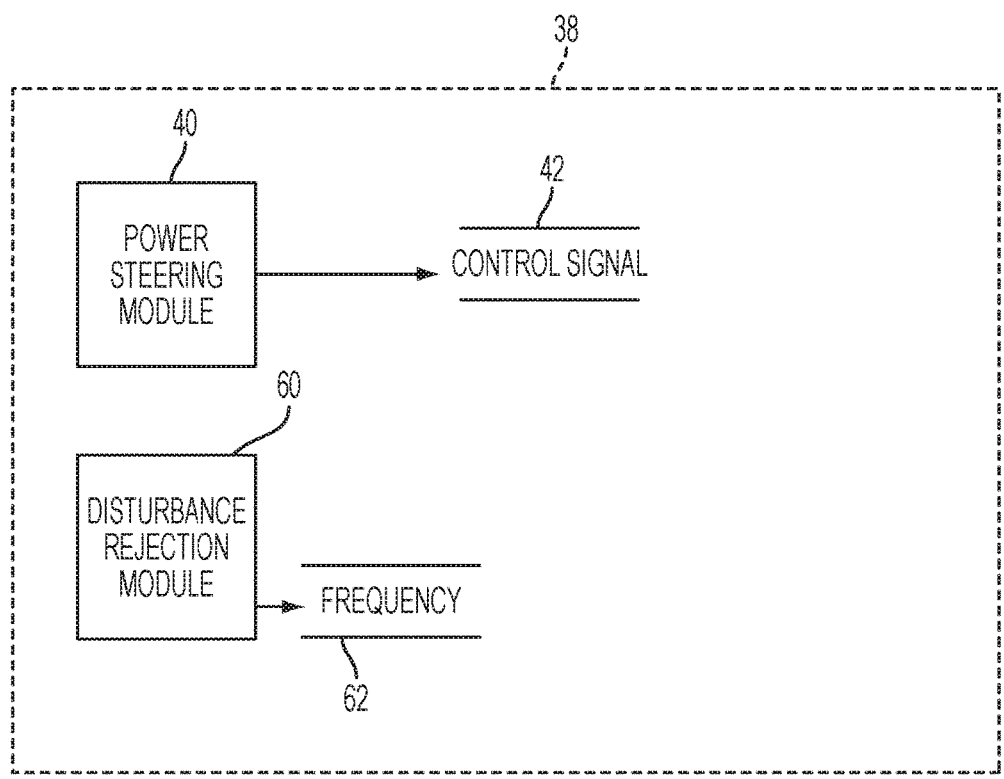
FIG. 2 is a dataflow diagram illustrating a non-limiting exemplary embodiment of a control module in accordance with the HPS system of FIG. 1.

FIG. 2 is a dataflow diagram illustrating a non-limiting, exemplary, embodiment of a control module 38 of the steering system 12 used to control various elements of the steering system 12. The control module 38 can include at least one sub-module and datastore. As used herein, the terms "center," "module," and "sub-module" refer to an application-specific integrated circuit (ASIC), an electronic circuit, a processor (shared, dedicated, or group), and memory that executes at least one software or firmware program, an algorithm, a combinational logic circuit, and/or other suitable components that provide described functionality. It should be readily appreciated that the sub-modules can be combined and/or further partitioned to reduce steering-torque variation and implemented as a single control module 38 (as shown) or multiple control modules (not shown). Inputs to the control module 38 can be generated from the sensors 32, 34, 36, modeled within the control module 38 [e.g., by other sub-modules (not shown)], received from other control modules (not shown), and/or pre-defined.

As shown in FIG. 2, the control module 38 of the steering system 12 includes a power-steering module 40. The power-steering module 40 performs control methods such as, but not limited to, steering assist methods and damping methods. Depending upon the specific control method, an output of the power-steering module 40 can be a control signal 42 that requests a torque.

The HPS system 12 may be a magnetic steer, torque overlay, (MTO) steering system. The MTO steering system 12 incorporates a magnetic actuator in a hydraulic-valve assembly. This allows advanced features to be implemented into the MTO steering system 12, such as variable effort, leads-and-pulls correction, active damping, and active return. In many legacy cases, tuning of these advanced features, desired for optimal feel of steering of the vehicle 10, undesirably increases transmissibility of the disturbance (e.g., road wheel imbalance) into the MTO steering system 12. It is generally understood that the term "torque overlay" is a steering solution that may analyze input from multiple vehicle systems to determine an appropriate steering wheel response to various conditions. Torque overlays may be applied to power steering system through software programming, algorithms, and/or enhancements to hardware, and function to add or subtract torque to the steering system independent of driver input in either direction.

The disturbance can cause undesirable vibrations in the handwheel 14 detectable by the driver. These vibrations may be directly related to the rotational mean velocity of the road wheels 28, 30. The severity of the vibrations at the handwheel 14 may depend upon the magnitude of the disturbance, and/or the chassis and steering design.

Figure 3:
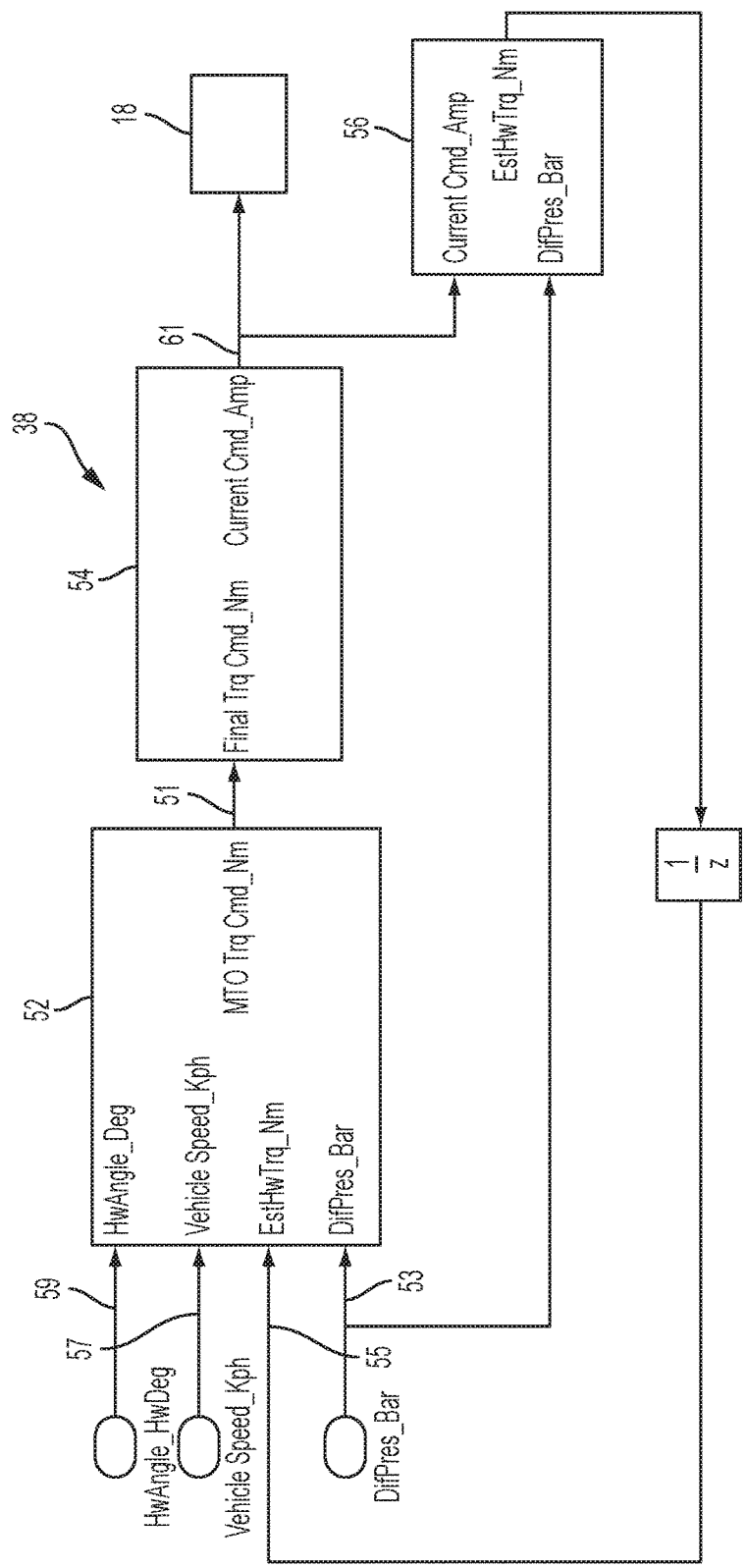
FIG. 3 is a block diagram illustrating a control system for a power steering system including magnetic torque overlay (MTO)

FIG. 3 is a block diagram illustrating the control center 38 of the MTO steering system 12. The control center 38 may include an MTO torque-command module 52, a current-command module 54, and a torque-estimation module 56. In the control center 38, a MTO base torque command 51 is determined or generated in the torque-command module 52. More specifically, the torque-command module 52 may receive a plurality of input signals (i.e., four illustrated as 53, 55, 57, 59), and processes the inputs and/or applies algorithm(s), to generate the base MTO torque command 51. The first input signal 53 may be a piston differential pressure signal that is associated with a measurement of differential pressure across a piston (not shown) in the MTO steering system 12. The second input signal 55 may be an estimation of torque signal that is generally reflective of the desired torque (i.e., a prediction) that a driver will want to apply to the steering wheel 14. The third input signal 57 may be a vehicle speed signal indicative of the speed of the vehicle 10 and/or rotational speed of the road wheels 28, 30. The fourth input signal 59 may be a handwheel angular position signal indicative of the angle of the handwheel 14.

The base torque command 51 is provided to the current-command module 54 that converts the base torque command 51 into a current command 61. The current command 61 may be applied to the steering assist unit 18. More specifically, the current command 61 may be applied to a coil (not shown) of a magnetic actuator (not shown) in a steering gear (not shown) of the MTO steering system 12. The current command 61 and piston differential pressure signal 53 are used to generate in the driver-torque-estimation module 56 the "next" estimation of torque signal 55 that can be used in the next iterative loop.

Figure 4:
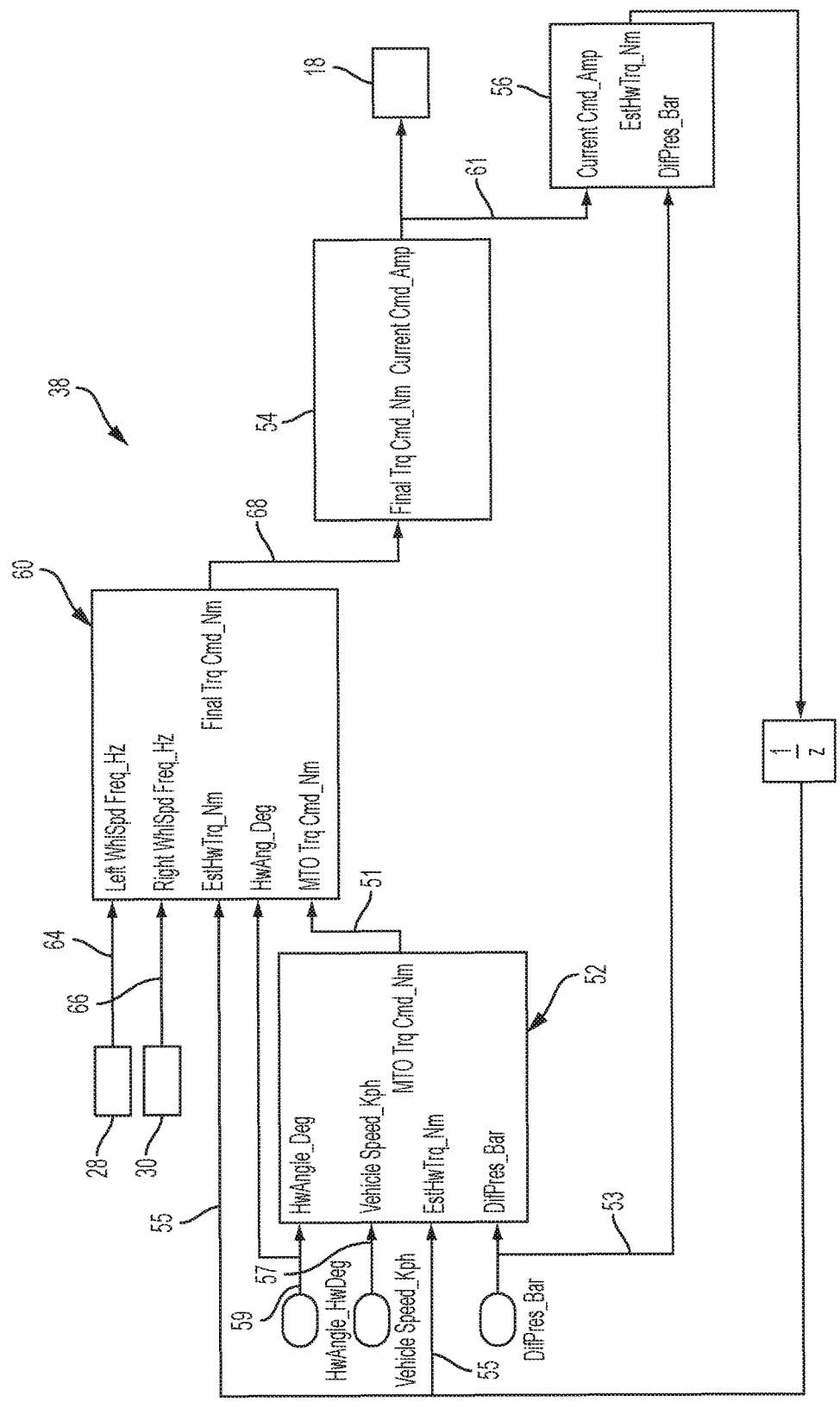
FIG. 4 is a block diagram illustrating a non-limiting exemplary embodiment of a control system including disturbance rejection in accordance with the invention for the MTO steering system.

FIG. 4 illustrates a further refinement of the control center 38 for the MTO steering system 12 according to the present disclosure. The control center 38 includes functionality in the form of disturbance rejection for rejecting the undesirable vibrations in the handwheel 14 due to the disturbance in the road wheels 28, 30 (i.e., road-wheel imbalance). Toward that end, the control center 38 (FIGS. 1 and 2) includes a disturbance-rejection module 60 that may be a wheel-imbalance-rejection (WIR) module. The WIR module 60 determines a force of a disturbance that may act upon the steering assist unit 18 (see FIG. 1), and generates a final torque command signal 68 that may be expressed in units of torque (e.g., newton meter). In FIGS. 5-13, logic implemented in the WIR module 60 is shown.

More specifically, FIG. 4 is a block diagram illustrating the control center 38 including the WIR module 60. In the control center 38, the base MTO torque command 51 is determined or generated in the torque-command module 52. In an aspect of the embodiment, a measurement of differential pressure across the piston (i.e., the piston differential pressure signal 53) in the MTO steering system 12, various signals of the vehicle 10 (e.g., the piston differential pressure signal 53, the vehicle speed signal 57, and the handwheel angular position signal 59), and an estimation of torque signal (55) of the driver are used to generate the base torque command 51. In a version of this aspect, the vehicle signals 57, 59 respectively include speed of the vehicle 10 (i.e., road wheels 28, 30) and angle of the handwheel 14.

At least the base torque command 51 is passed to the WIR module 60 from the torque-command module 52. In another version, the driver-torque-signal estimation (i.e., estimation of torque signal 55), and hand-wheel angle (i.e., handwheel angular position signal 59) can be passed also to the WIR module 60, along with a first wheel speed signal 64 that may be associated with the road wheel 28, and a second wheel speed signal 66 that may be associated with the road wheel 30. Utilizing signals 55, 59, 64, 66, the WIR module 60 modifies the base torque command 51 to minimize vibration at the handwheel 14. The resulting final torque command 68 is provided to the current-command module 54 that converts the final torque command 68 into the current command 61. The current command 61 is applied to the steering assist unit 18 of the MTO steering system 12 to generate a desired assist torque (i.e., applied to the coil of the magnetic actuator in the steering gear of the steering assist unit 18). At least the current command 61 is used to generate, in the driver-torque-estimation module 56, the estimation of torque signal 55 by the driver. In still another version, the measured differential pressure (i.e., piston differential pressure signal 53) is also used to generate the driver-torque estimation.

Figure 5:
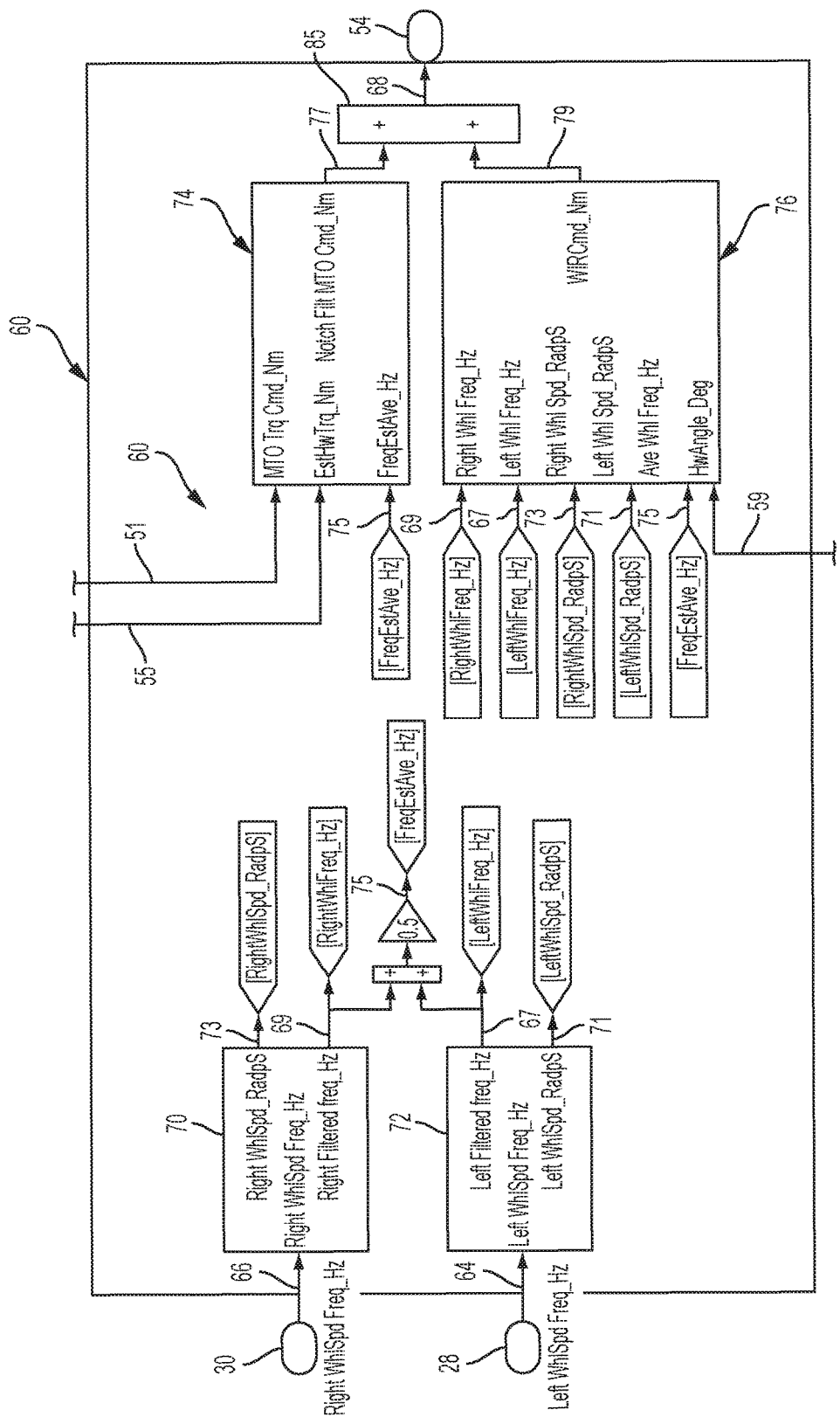
FIG. 5 is a block diagram illustrating a non-limiting exemplary embodiment of a disturbance-rejection module in accordance with the control system of FIG. 4.

FIG. 5 is a block diagram illustrating a non-limiting exemplary embodiment of the WIR module 60 of the control center 38. As shown in FIG. 5, right and left wheel-speed-conversion-and-filter modules 70, 72 of the WIR module 60 are configured to scale and low-pass filter the respective signals 66, 64 for corresponding individual wheel speeds to provide respective filtered signals 69, 67 for filtered frequency, and respective radian signals 73, 71 for unfiltered frequency that is scaled to radians per second. Filtered right and left wheel-speed frequencies (i.e., filtered signals 69, 67) are averaged to determine an averaged filtered signal 75 for estimated frequency.

Also as part of the WIR module 60, the base torque command 51 is run through a notch filter 74 to remove frequency content of the base torque command 51 at the estimated frequency of the wheel speeds (i.e., averaged filtered signal 75). The notch filter 74 may also receive the estimation of torque signal 55 for processing with the base torque command 51, and toward the output of a notched torque command 77, to be described further below.

The filtered signals 67, 69, the radian signals 71, 73 signals, and the handwheel angular position signal 59 are provided to and run through a WIR subsystem 76 of the WIR module 60. In this way, the final torque command 68 is, at least in-part, produced to aid in reduction or elimination of undesirable vibration at the handwheel 14 due to wheel imbalance.

Figure 6:
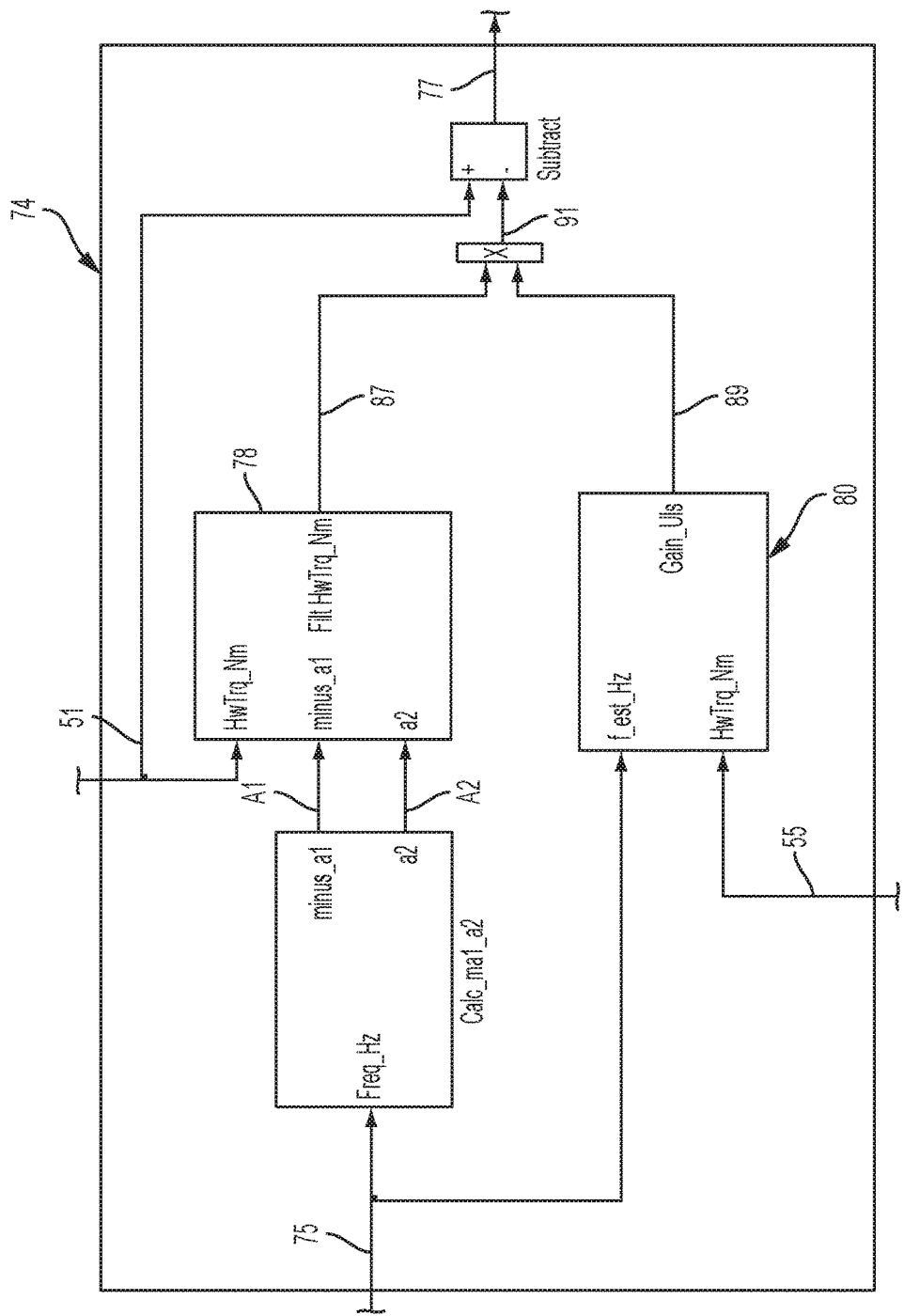
FIG. 6 is a block diagram illustrating implementation of a non-limiting exemplary embodiment of a notch filter in accordance with the disturbance-rejection module of FIG. 5.

FIG. 6 is a block diagram illustrating implementation of a non-limiting, exemplary, embodiment of the notch filter 74 of the WIR module 60. As shown in FIG. 6, an estimated frequency (i.e., the averaged filtered signal 75) is used to determine coefficients A1, A2 of a unity-gain-resonance filter 78 with a pole located at a wheel-imbalance frequency for a current operating speed. The base torque command 51 is run through the unity-gain-resonance filter 78 to extract content at the wheel-imbalance frequency and generate a filtered torque command 87.

The estimated average frequency (i.e., the averaged filtered signal 75) and estimated torque (i.e., the estimation of torque signal 55) of the handwheel 14 run through a notch-filter-gain module 80 of the notch filter 74 to generate a gain value 89. The filtered torque command 87 is multiplied by the gain value 89 (e.g., 0 to 1), and the resulting product (i.e., the adjusted-filtered torque command 91) is subtracted from the original signal (i.e., the base torque command 51) to remove filtered-frequency content from the final torque command 68. The gain value 89 allows the notch filter 74 to be applied only when conditions require it.

Figure 7:
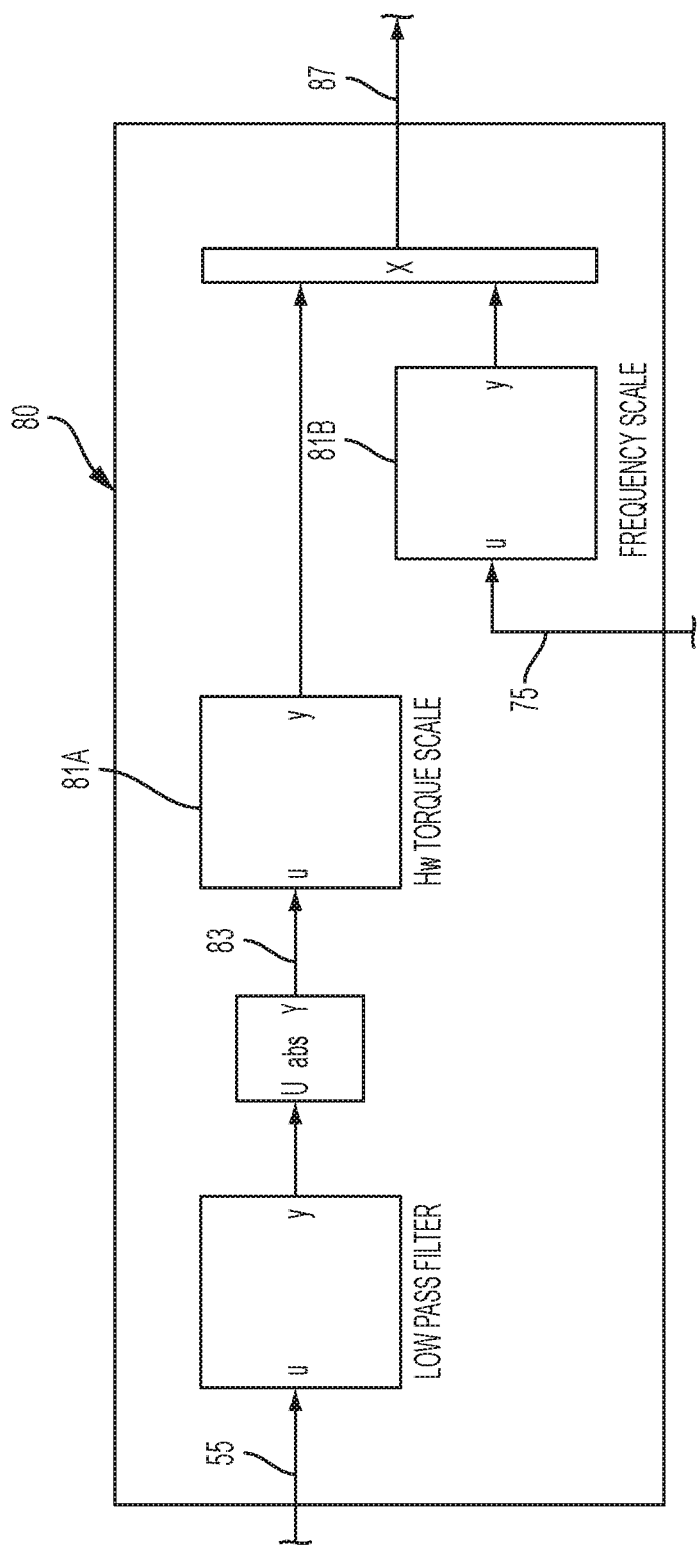
FIG. 7 is a block diagram illustrating implementation of a non-limiting exemplary embodiment of a notch-filter gain in accordance with the notch filter of FIG. 6.

FIG. 7 is a block diagram illustrating implementation of a non-limiting, exemplary, embodiment of the notch-filter-gain module 80 of the notch filter 74. FIG. 7 shows implementation in which a first look-up table (see box 81A) based upon a filtered value (see arrow 83) of estimated driver torque (i.e., estimation of torque signal 55) and look-up table 81B based upon estimated frequency (i.e., averaged filtered signal 75) are used to enable the notch filter 74 when both driver torque and wheel frequency (i.e., signals 55, 75) are in a desired range. Referring again to FIG. 5, an output command 79 produced by the WIR subsystem 76 is added (see box 85) to the notched torque command 77 to produce the final torque command 68. It should be readily appreciated that any suitable type of signal can be used to change gain.

Figure 8:
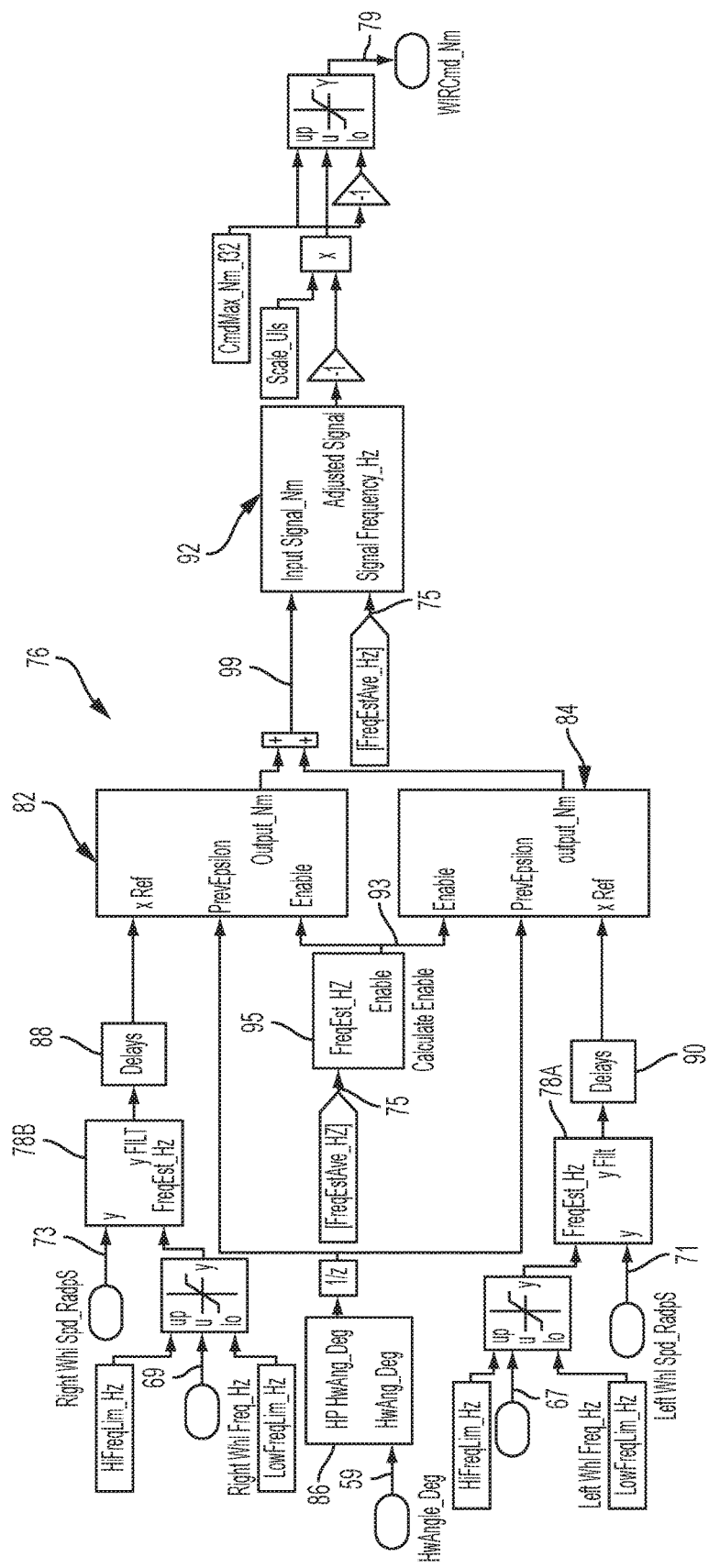
FIG. 8 is a block diagram illustrating implementation of a non-limiting exemplary embodiment of a disturbance-rejection subsystem in accordance with the disturbance-rejection module of FIG. 5.

FIG. 8 is a block diagram illustrating implementation of a non-limiting, exemplary, embodiment of the WIR subsystem 76 of the disturbance rejection module 60. As shown in the figure, unfiltered right and left wheel speeds (i.e., respective wheel speed radian signals 71, 73) are passed through individual, respective, unity-gain-resonance filters 78A, 78B. Filtered wheel speeds (i.e., left and right filtered signals 67, 69) are used to determine the filter coefficients for the respective unity-gain-resonance filters 78A, 78B with a pole located at a wheel-imbalance frequency for a current operating speed. Output of each filter 78A, 78B is passed through respective Tapped Delay blocks 88, 90 to provide a predetermined number of samples as a reference signal to respective left and right adaptive filters 84, 82.

The handwheel angular position signal 59 is first passed through a high-pass filter 86 of the WIR subsystem 76 to remove direct-current content and then used in calculation of coefficients for the individual adaptive filters 82, 84. The adaptive filters 82, 84 provide a command to minimize frequency content of the handwheel angular position signal 59 that correlates to the reference signal (i.e., left and right filtered signals 67, 69). The adaptive filters 82, 84 can be powered on and off with an enabling signal. The figure shows an enabling signal 93 that is generated by a look-up table 95 based upon the estimated wheel frequency (i.e., averaged filtered signal 75).

Figure 9:
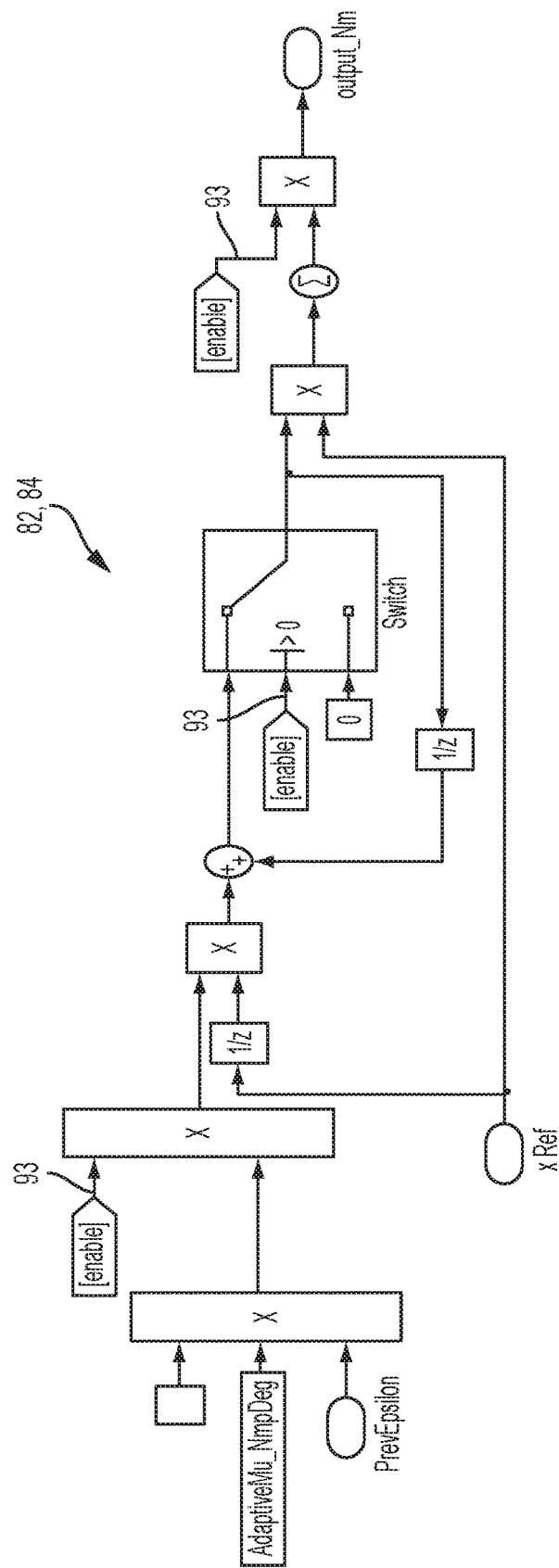
FIG. 9 is a block diagram illustrating implementation of a non-limiting exemplary embodiment of adaptive filters in accordance with the disturbance-rejection subsystem of FIG. 8.

FIG. 9 is a block diagram illustrating implementation of a non-limiting, exemplary, embodiment of the adaptive filters 82, 84 of the WIR subsystem 76. The example shown is based upon a least-mean-squares algorithm (LMS algorithm). The LMS algorithm changes filtered-tap weights so that error (eps) is minimized in a mean-square sense. It should be readily appreciated that, although the LMS algorithm is applied here due to its computational efficiency, other iterative search algorithms may be employed. It should be readily appreciated that any suitable type of signal can be used to change gain.

In FIG. 9, PrevEpsilon input is used as an error signal for learning (e.g., hand-wheel angle). It should be readily appreciated that handwheel velocity and acceleration are also suitable error signals (as oscillation within the signal is relevant). Reference signal input "x Ref" (FIG. 8) is filtered wheel speed. Learning is active when enable is non-zero. Enabling signal 93 is commonly "1" when learning is desired. However, it should be readily appreciated that other values for enable may be used if additional frequency scaling is desired. A basic function is to filter "x Ref" to generate an output. This is accomplished at each time step by multiplying elements of vectors "x Ref" times a vector that represents filter weights.

A number of elements in the vectors is determined by the right and left Tapped Delay blocks 90, 88 (FIG. 8). Filter-learning speed is controlled by constant AdaptiveMu multiplied by two. Output of the two adaptive filters 82, 84 are summed together to provide a pre-torque command 99 to reduce vibration of the handwheel 14 that correlates to measured wheel imbalance. The pre-torque command 99 is passed through a phase-adjust subsystem 92 (FIG. 8) to account for steady-state-system lags between the pre-torque command 99 and physical torque produced. Also, the two unity-gain-resonance filters 78A, 78B (FIG. 8) can likewise be brought together and passed through the Tapped Delay block 88 and adaptive filter 82.

Figure 10:
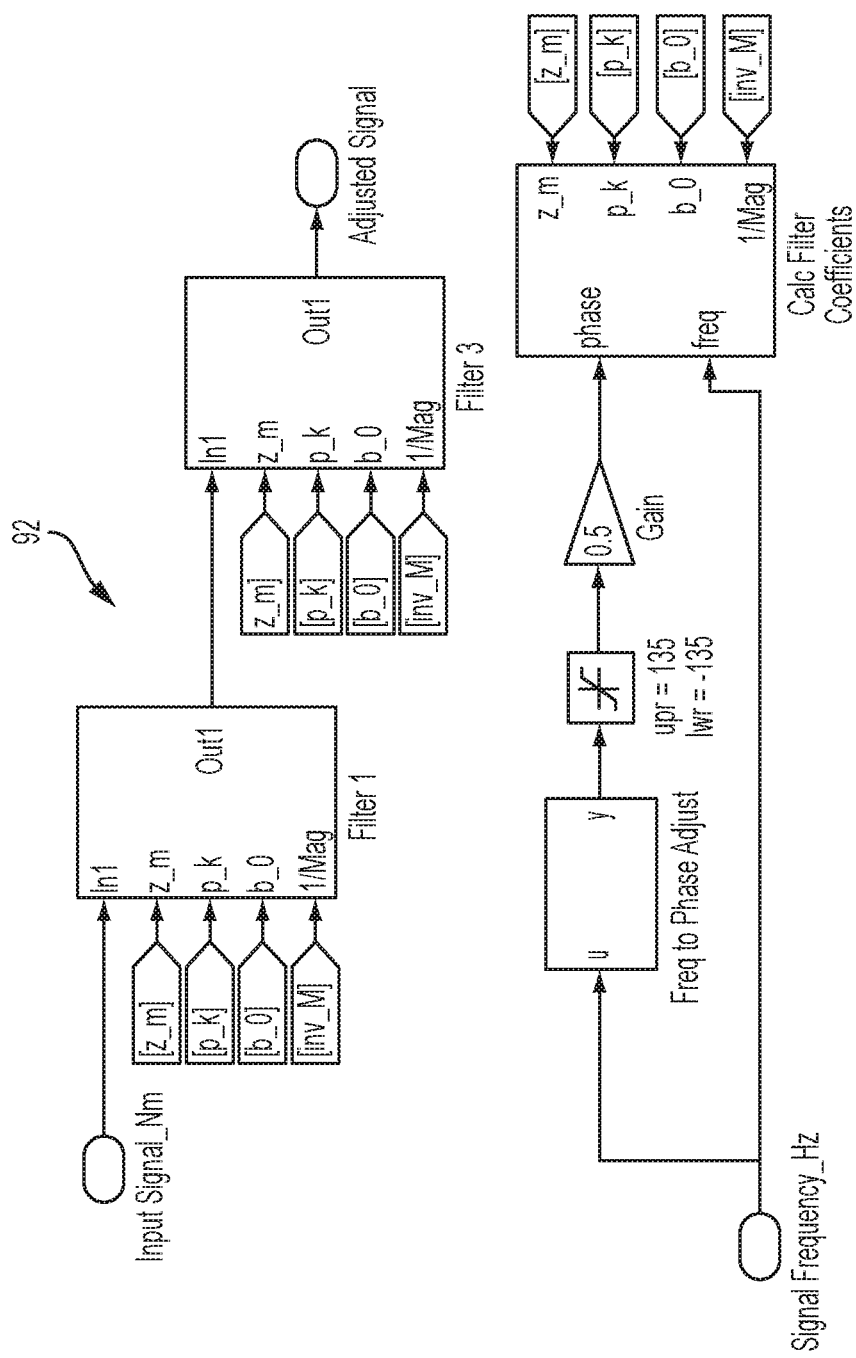
FIG. 10 is a block diagram illustrating implementation of a non-limiting exemplary embodiment of a phase-adjust subsystem in accordance with the disturbance-rejection subsystem of FIG. 8.

FIG. 10 is a block diagram illustrating implementation of a non-limiting exemplary embodiment of the phase-adjust subsystem 92 of the WIR subsystem 76. In this implementation, amount of phase adjust can be varied by a look-up table based upon average wheel frequency. Referring again to FIG. 8, output of the phase-adjust subsystem 92 is limited and scaled to produce final output (i.e., WIR subsystem output command 79) of the WIR subsystem 76.

Figure 11:
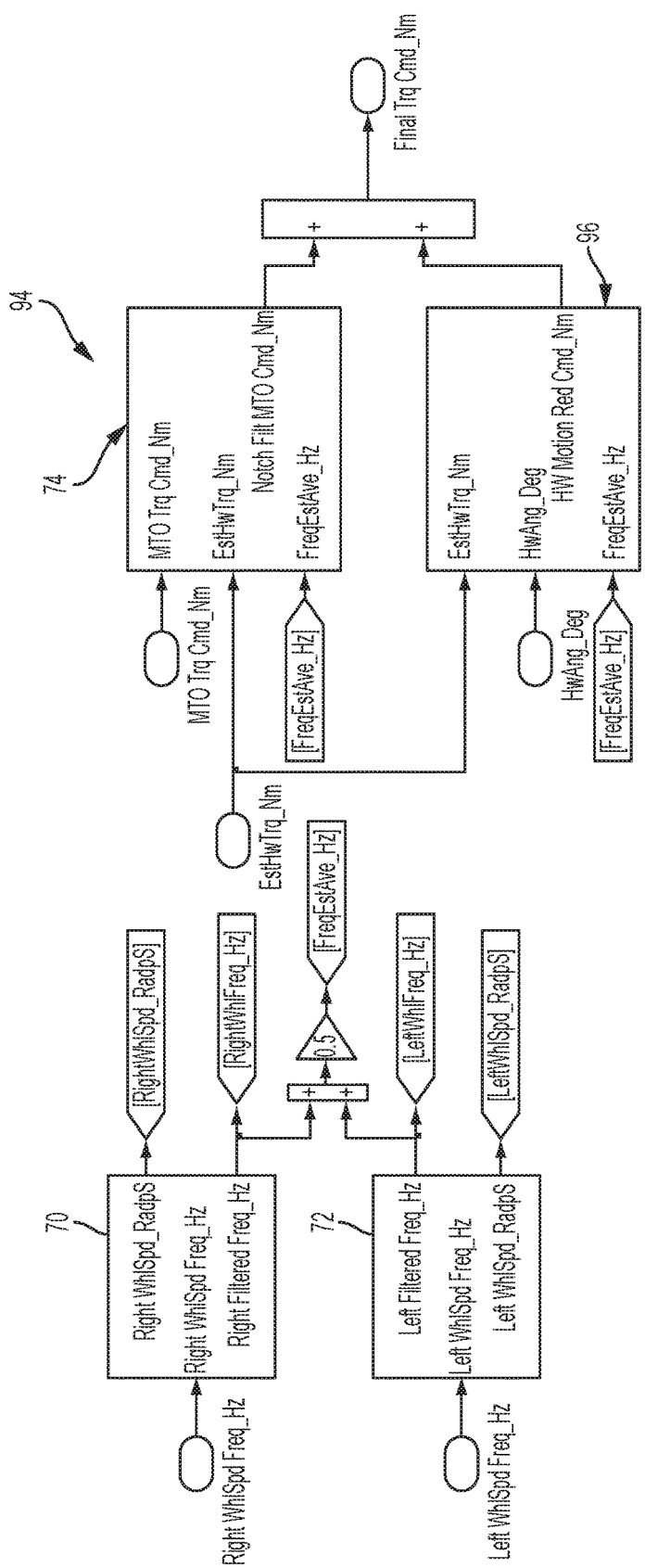
FIG. 11 is a block diagram illustrating another non-limiting exemplary embodiment of the disturbance-rejection module including disturbance rejection in accordance with the invention for the MTO steering system.

FIG. 11 is a block diagram illustrating another non-limiting, exemplary, embodiment of the disturbance-rejection module 94 including disturbance rejection. As shown in FIG. 11, this embodiment differs in that the WIR subsystem 76 is replaced with a hand-wheel-motion-reduction subsystem 96. Estimated-wheel-speed-frequency signal, estimated-driver-torque signal, and hand-wheel-angle signal are provided to the hand-wheel-motion-reduction subsystem 96 to produce a torque command to aid in reduction or elimination of undesirable vibration at the handwheel 14 due to wheel imbalance. The torque command produced by the hand-wheel-motion-reduction subsystem 96 is added to the notch-filtered torque command to produce a final torque command.

Figure 12:
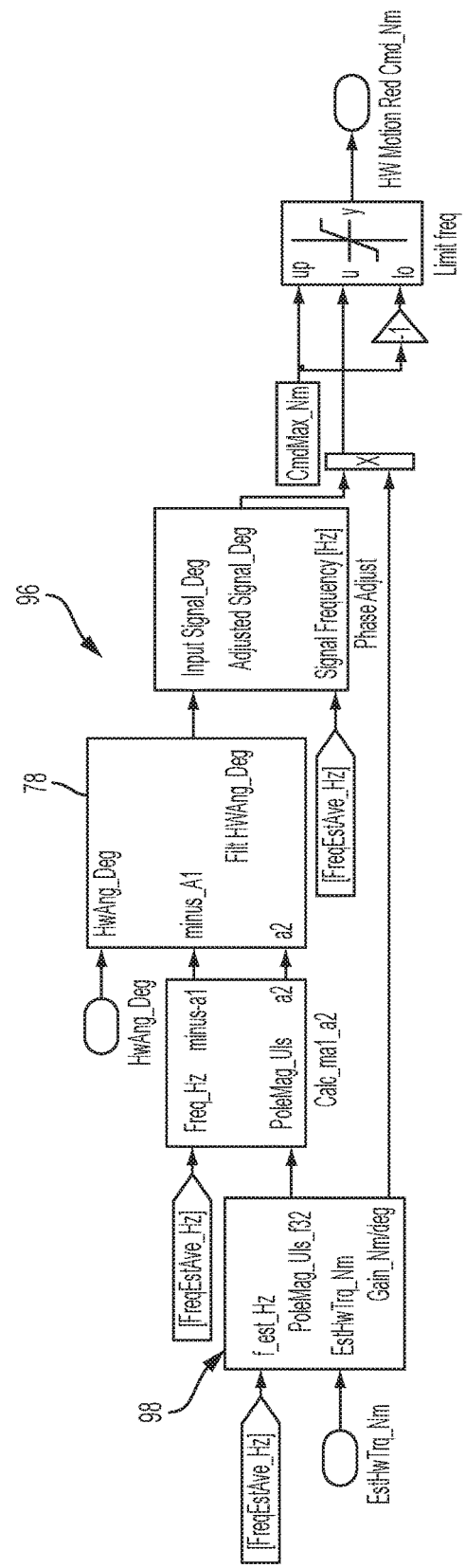
FIG. 12 is a block diagram illustrating implementation of a non-limiting exemplary embodiment of a hand-wheel-motion-reduction subsystem in accordance with the disturbance-rejection module of FIG. 11.

FIG. 12 is a block diagram illustrating implementation of a non-limiting, exemplary, embodiment of the hand-wheel-motion-reduction subsystem 96. As shown in FIG. 12, in a gain-and-pole-magnitude subsystem 98, wheel-speed frequency and estimated driver torque are used to determine pole magnitude of the unity-gain-resonance filter 78 and gain of the hand-wheel-motion-reduction subsystem 96.

Figure 13:
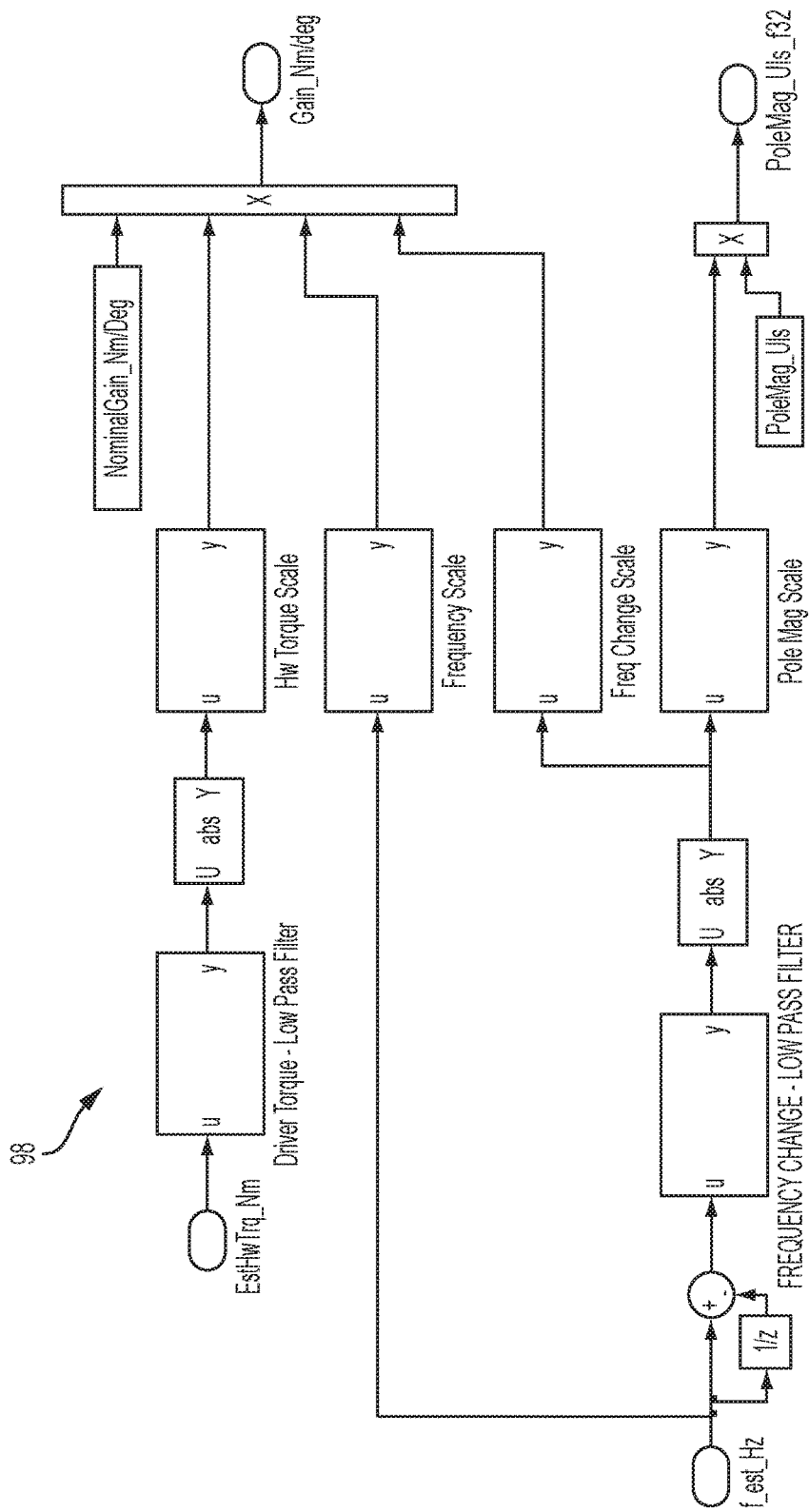
FIG. 13 is a block diagram illustrating implementation of a non-limiting exemplary embodiment of a gain-and-pole-magnitude subsystem in accordance with the hand-wheel-motion-reduction subsystem of FIG. 12.

FIG. 13 is a block diagram illustrating implementation of a non-limiting, exemplary, embodiment of the gain-and-pole-magnitude subsystem 98. In this implementation, look-up tables based upon driver torque, wheel-speed frequency, and wheel-speed-frequency change are used to modify gain and filtered-pole magnitude.

Referring again to FIG. 12, pole magnitude and wheel-speed frequency are used to calculate filter coefficients for a unity-gain-resonance filter 78 with a pole located at a wheel-imbalance frequency for a current operating speed. A hand-wheel-angle signal is passed through the unity-gain-resonance filter 78 to provide an amount of hand-wheel vibration at the wheel-imbalance frequency. Output of the unity-gain-resonance filter 78 is passed through a phase-adjust subsystem 92. Output of the phase-adjust subsystem 92 is multiplied by gain previously determined in the gain-and-pole-magnitude subsystem 98, and the resulting product is limited to produce final output of the hand-wheel-motion-reduction subsystem 96.

Figure 14:
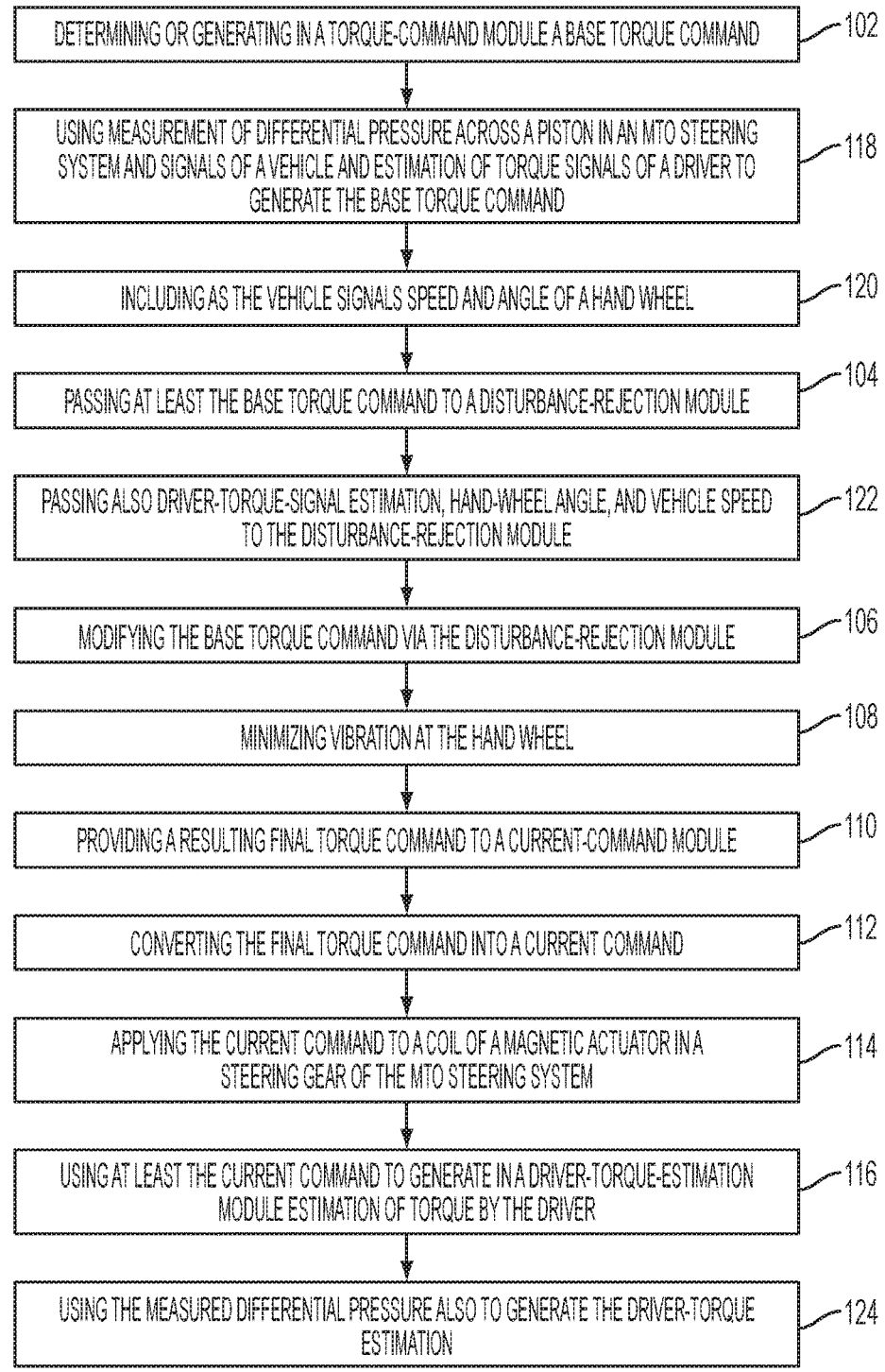
FIG. 14 is a flowchart illustrating a non-limiting exemplary embodiment of a control method in accordance with the invention for the MTO steering system.

With continued reference to FIGS. 1 and 2, FIG. 14 is a flowchart illustrating a non-limiting exemplary embodiment of a control method 100 for the steering system 12. The method 100 can be performed by the control center 38 of FIG. 1 in accordance with the present disclosure. As can be appreciated in light of the present disclosure, order of operation within the method 100 is not limited to sequential execution as illustrated in FIG. 14, but may be performed in at least one vary order as applicable and in accordance with the present disclosure. The method 100 can be scheduled to run based upon predetermined events and/or run continually during operation of the steering system 12.

The method 100 includes, at step 102, determining or generating in the torque-command module 52 the base torque command 51; at step 104, passing at least the base torque command 51 to the WIR module 60; at step 106, modifying the base torque command 51 via the WIR module 60; and, at step 108, minimizing vibration at the handwheel 14. Continuing, the method includes, at step 110, providing the resulting final torque command 68 to the current-command module 54; at step 112, converting the final torque command 68 into the current command 61; and, at step 114, applying the current command 61 to the coil of the magnetic actuator in the steering gear of the MTO steering system 12. At step 116, at least the current command 61 is used to generate in the driver-torque-estimation module 56 the estimation of torque by the driver.

In an aspect of this embodiment, the method 100 includes further, at step 118, using the measurement of differential pressure across the piston in the MTO steering system 12 and various signals of the vehicle 10 and the estimation of torque signals 55 of the driver to generate the base torque command 51. In a version of this aspect, the method 100 includes further, at step 120, including as the vehicle signals the speed of the vehicle 10 (i.e., road wheels 28, 30) and angle of the handwheel 14 (i.e. handwheel angular position signal 59). In another aspect, the method includes, at step 122, passing also the driver-torque-signal estimation (i.e., estimation of torque signal 55), hand-wheel angle (i.e., handwheel angular position signal 59), and vehicle speed (i.e., vehicle speed signal 57) to the WIR module 60. In still another aspect, the method 100 includes further, at step 124, using the measured differential pressure (i.e., differential pressure signal 53) also to generate the driver-torque estimation.

The system 52 and method 100 minimize or eliminate undesirable vibrations in the handwheel 14 of the vehicle 10 as a result of disturbance in the road wheels 28, 30 (e.g., road-wheel imbalance) in the MTO steering system 12.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A control method of reducing vibration in a handwheel of a magnetic torque overlay (MTO) steering system, the method comprising:
    providing a base torque command, a left wheel speed signal associated with a left road wheel, right wheel speed signal associated with a right road wheel, a handwheel angular position signal, and an estimation of torque signal to a wheel imbalance rejection (WIR) module for generation of a final torque command by modifying the base torque command based at least in-part by comparing the left and right wheel speed signals to determine a wheel imbalance between the left and right road wheels and to identify a force of disturbance attributable from the left and right wheel speed signals and thereby generate the final torque command; and
    controlling the MTO steering system to generate a desired assist torque based on the final torque command.

2. The control method set forth in claim 1, further comprising:
    providing the left and right wheel speed signals to respective first and second wheel speed conversion and filter modules of the WIR module configured to respectively output first and second unfiltered radian signals, and first, and second filtered signals having units of frequency toward generation of the final torque command.

3. The control method set forth in claim 2, further comprising:
    averaging the first and second filtered signals to generate an averaged filtered signal toward generation of the final torque command.

4. The control method set forth in claim 3, further comprising:
    passing the averaged filtered signal, the base torque command, and the estimation of torque signal to a notch filter of the WIR module to generate a notched torque command toward generation of the final torque command.

5. The control method set forth in claim 4, further comprising:
    passing the first and second filtered signals, the first and second radian signals, the averaged filtered signal, and the handwheel angular position signal to a subsystem of the WIR module for generating a subsystem output command; and
    summing the subsystem output command with the notched torque command to generate the final torque command.

6. The control method set forth in claim 5, further comprising:
    establishing coefficients for a unity gain resonance filter of the notch filter from the averaged filtered signal; and
    locating a pole at a wheel imbalance frequency for a current operating speed and the base torque command is run through the unity gain resonance filter to extract content at the wheel imbalance frequency thereby generating a filtered torque command.

7. The control method set forth in claim 6, further comprising:
    passing the averaged filtered signal and estimation of torque signal to a notch filter gain module of the notch filter to generate a gain value;
    multiplying the filtered torque command by the gain value to generate an adjusted-filtered torque command; and
    subtracting the adjusted-filtered torque command from the base torque command to generate the notched torque command.

8. The control method set forth in claim 7, further comprising:
    applying a frequency scaled table of the notch filter gain module to the averaged filtered signal to generate;
    filtering the estimation of torque signal to generate a filtered value;
    applying a torque scaled table of the notch filter gain module to the filtered value; and
    enabling the notch filter when both the averaged filtered signal and the filtered value are within a desired range as reflected via the respective frequency and torque scaled tables.

9. The control method set forth in claim 1, further comprising:
    providing a vehicle speed signal, the estimation of torque signal, the handwheel angular position signal, and a differential pressure signal outputted by an MTO steering assist unit into a torque-command module for generation of the base torque command.

10. The control method set forth in claim 1, further comprising:
    converting the final torque command expressed in units of torque to a current command; and
    sending the current command to the MTO steering assist unit.

11. The control method set forth in claim 10, further comprising:
    sending the current command and the differential pressure signal to a torque estimation module for generating a next estimation of torque signal.

12. The control method set forth in claim 11, wherein the left and right wheel speed signals have units of frequency.

13. A control center for a MTO steering system comprising:
    a WIR module configured to receive a base torque command, a handwheel angular position signal, an estimation of torque signal, a left wheel speed signal, and a right wheel speed signal to identify a force of disturbance attributable from the left and right wheel speed signals and thereby generate a final torque command used to establish a desired assist torque.

14. The control center set forth in claim 13, further comprising:
a torque command module configured to receive a differential pressure signal, the estimation of torque signal, a vehicle speed signal, and the handwheel angular position signal to generate a base torque command.

15. The control center set forth in claim 13, wherein the WIR module includes left and right wheel speed conversion and filter modules configured to respectively receive the left and right wheel speed signals expressed in units of frequency, and generate respective left and right filtered signals expressed in units of frequency, and generate respective left and right radian signals expressed in units of degrees.

16. The control center set forth in claim 15, wherein the left and right filtered signals are averaged to generate an averaged filtered signal, wherein the WIR module includes a notch filter configured to receive the averaged filtered signal, the base torque command, and the estimation of torque signal to generate a notched torque command, and wherein the notched torque command is reflective of the base torque command subtracted by an adjusted-filtered torque command generated by the averaged filtered signal and the estimation of torque signal.

17. The control center set forth in claim 16, wherein the notch filter includes a unity gain resonance filter configured to receive the base torque command and apply coefficients reflective of the averaged filtered signal to generate a filtered torque command, and includes a notch filter gain module configured to receive the averaged filtered signal and the estimation of torque signal, compare the signals to data tables and generate a gain value base on the comparison, and wherein the adjusted-filtered torque command is based on the filtered torque command and the gain value.

* * * * *